United States Patent [19]

Counter et al.

[11] Patent Number: 5,176,247
[45] Date of Patent: Jan. 5, 1993

[54] SIDEFLEXING CONVEYOR CHAIN INCLUDING LOW CENTERLINE HINGE PIN

[75] Inventors: Louis F. Counter, Greendale, Wis.; Robert H. Bigoness, Utica, Mich.; Peter J. Ensch, Wauwatosa, Wis.

[73] Assignee: Rexnord Corporation, Milwaukee, Wis.

[21] Appl. No.: 743,693

[22] Filed: Aug. 12, 1991

[51] Int. Cl.⁵ ............................................. B65G 15/02
[52] U.S. Cl. .................................. 198/831; 198/852; 198/853
[58] Field of Search ..................... 198/831, 853, 852

[56] References Cited

U.S. PATENT DOCUMENTS

| | | | |
|---|---|---|---|
| 3,262,550 | 7/1966 | Kampfer | 198/840 |
| 3,512,627 | 5/1970 | Hodlewsky et al. | 198/852 X |
| 3,513,964 | 5/1970 | Imse | 198/852 |
| 3,581,873 | 6/1971 | Spodig | 198/690 |
| 3,804,232 | 4/1974 | Freiwald et al. | 198/853 |
| 4,096,943 | 6/1978 | Gentsch | 198/793 |
| 4,236,632 | 12/1980 | Spodig | 198/690.1 |
| 4,436,200 | 3/1984 | Hodlewsky | 198/851 |
| 4,643,298 | 2/1987 | Wallaart | 198/805 |
| 4,742,906 | 5/1988 | Wallaart | 198/805 |
| 4,805,764 | 2/1989 | Van Zijderveld | 198/805 |
| 4,893,709 | 1/1990 | Schroeder et al. | 198/853 X |

FOREIGN PATENT DOCUMENTS

| | | |
|---|---|---|
| 0015066 | 2/1977 | Japan .................................. 198/852 |
| 2037690 | 7/1980 | United Kingdom . |
| 2182296 | 4/1986 | United Kingdom . |
| 8608993 | 4/1986 | United Kingdom . |

OTHER PUBLICATIONS

Rex Tabletop Chains, Catalog 933, Rexnord Corporation, copyright 1965 and 1973.

Primary Examiner—Robert P. Olszewski
Assistant Examiner—Cheryl L. Gastineau
Attorney, Agent, or Firm—Michael, Best & Friedrich

[57] ABSTRACT

A conveyor includes a track having at least one arcuate section, and a conveyor chain. The track comprises a pair of spaced apart track portions, each including a generally vertical guide surface. A first one of the guide surfaces defines the inside of an arcuate path and the other one of the guide surfaces defines the outside of the path. The conveyor chain is constructed and arranged for traversing the path and comprises a plurality of links, each of which has a first pivot eye at one end thereof and a pair of pivot eyes at the other end thereof and complementary to the first pivot eye. Pins couple the pivot eyes of pairs of adjacent links for pivotally connecting the same. Each link engages the first one of the surfaces as the chain traverses the path to generate reaction forces acting on each link and having an average line of action intersecting the first one of the surfaces. The pins are oriented transversely to the path defined by the surfaces and the axis of each pin is located below the average line of action of the reaction forces.

38 Claims, 2 Drawing Sheets

SIDEFLEXING CONVEYOR CHAIN INCLUDING LOW CENTERLINE HINGE PIN

BACKGROUND OF THE INVENTION

This invention relates to conveyor chains and more particularly to side-flexing chains designed to convey material along a track having arcuate sections.

Side-flexing conveyor chains are commonly used for transporting articles along a track having at least one arcuate or curved section. Under certain conditions, such as high speed and loading, these side-flexing chains have a tendency to "climb" or lift out of the curved sections of the track. This is a significant safety problem, in addition to causing poor product handling. As a result, there have been many prior art attempts to maintain conveyor chains within such curved track sections. These have included mechanical retainers such as tabs, as disclosed in U.S. Pat. No. 4,096,943 and U.S. Pat. No. 4,436,200 and beveled surfaces on the track wear sections and the chain links, such as are disclosed in U.S. Pat. No. 3,262,550. While such mechanical retainers did prevent the chain from pulling out of the curved track sections, they also prevented the chain from being lifted from the straight sections of the track. As a result, the track sections had to be removed for maintenance and cleaning, thereby complicating these procedures. Furthermore, chains with mechanical retainers still experienced some lift or tilting within the permitted tolerances between the chain and the track sections.

In order to avoid the maintenance and cleaning problems associated with mechanical retainers, an alternate method has been to magnetically maintain the conveyor chain in the curved track sections. Such magnetic retainers generally include permanent magnets positioned in or between the rails for applying a magnetic hold-down force on ferromagnetic portions of the chain links or coupling hinge pins. The magnetic approach has the advantage of allowing the chain to be easily pulled upwardly away from the corner sections of the track, since no mechanical retainer is employed. Examples of magnetic chain conveyors are disclosed in U.S. Pat. Nos. 3,581,873; 4,236,632; 4,643,298; 4,742,906; and U.S. Pat. No. 4,805,764; and U.K. patent publications 8608993, filed Apr. 14, 1986; GB 2182296A; and GB 2037690A. While magnetic retainers permit the chain to be lifted without removing track sections, the magnetic approach has several disadvantages. For example, the additional force exerted by the magnets consumes some of the chain's capacity by increasing turn factors, thereby limiting performance. In addition, the use of magnets is costly in that the corner track sections are complicated and require expensive components. Additionally, magnetic chain conveyors present a safety hazard because they provide no fail-safe mechanism to prevent the chain from leaving the corner sections other than the magnetic attraction.

Another disadvantage of magnetic retainers is that at least a portion of the conveyor chain must be formed of a magnetic material. For example, the magnetic chain conveyor disclosed in U.S. Pat. No. 4,805,764 comprises plastic chain links interconnected by hinge pins formed of a ferromagnetic material, while in U.S. Pat. No. 4,742,906, the links themselves are ferromagnetic. Such magnetic conveyor chains cannot be totally formed of plastic or Austenitic stainless steel, which possesses certain advantages over ferritic stainless and carbon steels, such as corrosion resistance and work hardening capability.

SUMMARY OF THE INVENTION

It is an object of the invention to provide a new and improved chain conveyor.

Another object of the invention is to provide a chain conveyor for transporting products through a curved track section wherein the chain can readily be removed from the track for cleaning and servicing.

A further object of the invention is to provide a chain conveyor for transporting articles through a curved track section wherein expensive magnetic components are not required.

Yet another object of the invention is to provide a chain conveyor for transporting articles through a curved tract section wherein performance is not reduced by the use of magnetic forces to retain the conveyor chain within the track.

A still further object of the invention is to provide a chain conveyor for transporting articles through a curved track section which is safe to operate.

Still another object of the invention is to provide a chain conveyor for transporting articles through curved track sections wherein mechanical or magnetic retainers are not required.

Yet another object of the invention is to provide a chain conveyor for transporting articles through a curved track section wherein all of the chain components can be formed of non-magnetic materials.

These and other objects and advantages of the present invention will become more apparent from the detailed description thereof taken with the accompanying drawings.

According to one aspect, the invention comprises a conveyor including track means having at least one arcuate section and comprising a pair of spaced apart track portions, each having a guide surface. A first one of the surfaces defines the inside of the path and the other one of the surfaces defines the outside of the path. The conveyor also includes a conveyor chain constructed and arranged for traversing the path and comprising a plurality of link means, each of which has a first pivotal connection means at one end thereof and a second pivotal connection means at the other end thereof and complementary to the first pivotal connection means. Pin means couples the first and second pivotal connection means of pairs of adjacent link means for pivotally connecting the same. Each link means engages the first one of the surfaces as the chain means traverses the path to generate reaction forces acting on each link means and having an average line of action. The pin means are oriented transversely to the path defined by the surfaces and the axis of the pin means is located below the average line of action of the reaction forces.

According to another aspect, the invention comprises a conveyor chain for use with a conveyor including a track with at least one curved section comprising a pair of spaced, generally parallel rails having carrying surfaces over which the chain traverses and a guide surface depending from the carrying surfaces for guiding a chain laterally relative to the rails. The chain has links presenting a substantially planar carrying surface and connecting means located below the carrying surface and includes first eye means on one side of the link, second eye means on the opposite side thereof and a hinge pin connects the eye means of adjacent links. The links are constructed and arranged for engaging the guide surface at the inside of the curve to generate a reaction force on the links having an average line of action extending generally parallel to the carrying surfaces and the axis of the hinge pin lies below the line of action of the reaction force.

According to another aspect, the invention comprises a link constructed and arranged to be joined with like links to form a conveyor chain for use with track means comprising a pair of spaced apart track means defining a curved path through which the conveyor chain traverses wherein one of the track means defines the inside of the curved section and includes a guide surface and the other track means defines the outside thereof. The link includes a top portion constructed and arranged to move over a track means for being supported thereby and first and second eye means projecting downwardly from the top link portion at the opposite ends of the link for being positioned, respectively, adjacent complementary eye means of adjacent links. First and second pivot openings in the first and second eye means, respectively, are constructed and arranged to receive a pivot pin therethrough for pivotally connecting the first and second eye means with those of adjacent links. The link has a reaction surface engageable with a guide surface for generating a reaction force on the reaction surface which is distributed over the surface and has an average line of action, the axis of the pin openings lying below the average line of action.

According to another aspect, the invention comprises a conveyor chain for use with track means having at least one arcuate section and comprising a pair of spaced apart track portions, each having a surface which defines an arcuate path therebetween. A first one of the surfaces defines the inside of the arcuate path and the other one of the surfaces defines the outside of the arcuate path. The conveyor chain means is constructed and arranged for traversing an arcuate path and comprises a plurality of link means, each of the link means having a first pivotal connection means at one end thereof and a second pivotal connection means at the other end thereof and complementary to the first pivotal connection means. Pin means pivotally couples the first and second pivotal connection means of pairs of adjacent link means, the pin means being oriented transversely to the path traversed by the chain means. Each of the link means is engageable with the first one of the path defining surfaces as the chain means traverses the path to generate a reaction force acting on each the link means and has an average line of action, the axis of the pin means being located below the average line of action to create a couple on the links acting to retain the links within the arcuate section of the track portions.

DETAILED DESCRIPTION OF THE PREFERRED EMBODIMENT

Figure 1:
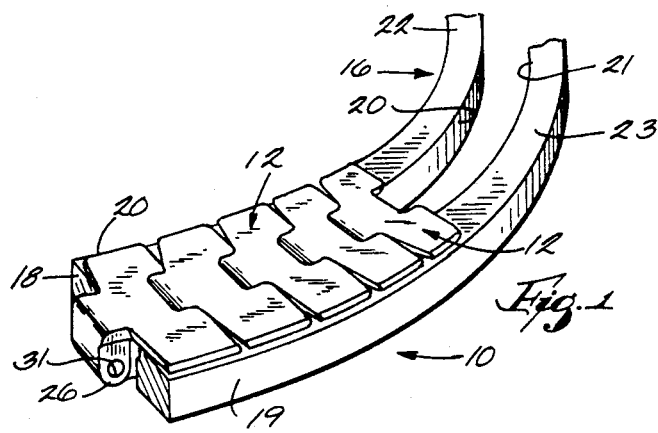
FIG. 1 is a perspective view of a portion of a conveyor according to the preferred embodiment of the invention.
Figure 4:
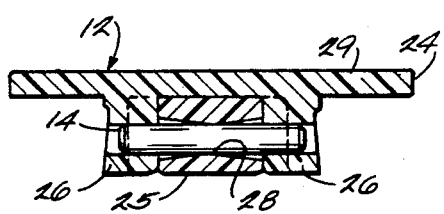
FIG. 4 is a view taken along lines 4-4 of FIG. 2.

FIG. 1 shows the conveyor chain 10 in accordance with the preferred embodiment of the invention to comprise a plurality of links 12 which are interconnected by hinge pins 14 (FIG. 4). The chain 10 traverses a guide track 16 which is formed by a pair of spaced apart wear strips or rails 18 and 19. The strips 18 and 19 are mounted atop a suitable, generally horizontal support structure and each respectively has a generally vertically oriented guide surface 20 and 21 and generally horizontally oriented carrying surfaces 22 and 23, which are equispaced apart along their entire lengths. It will be appreciated that the chain 10 is endless and that only a segment is shown in FIG. 1 to be located in a curved or corner section of the track 16 which may also include one or more straight and/or curved section, depending on the application. The chain 10 is driven by a drive sprocket (not shown) and may also engage one or more idler sprockets.

Figure 2:
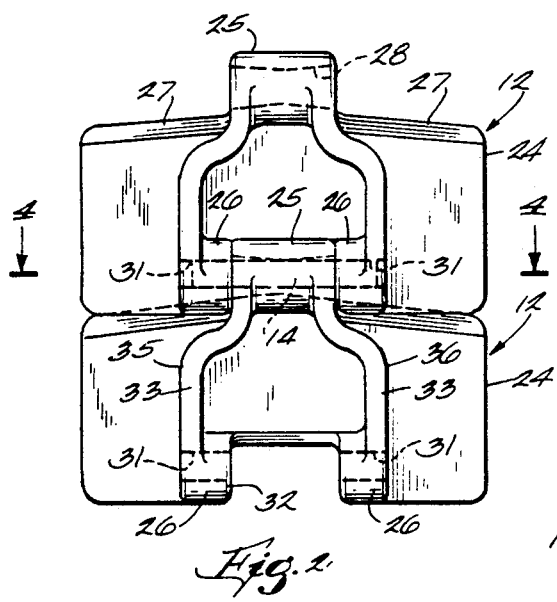
FIG. 2 is a bottom plan view of a portion of the conveyor illustrated in FIG. 1.
Figure 3:
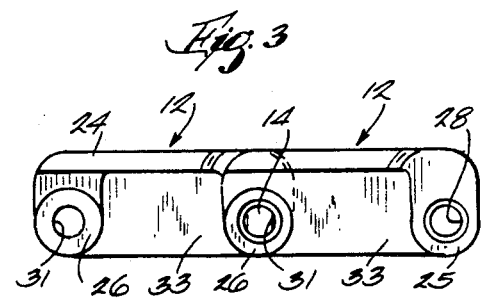
FIG. 3 is a side view of the conveyor portion shown in FIG. 2.
Figure 6:
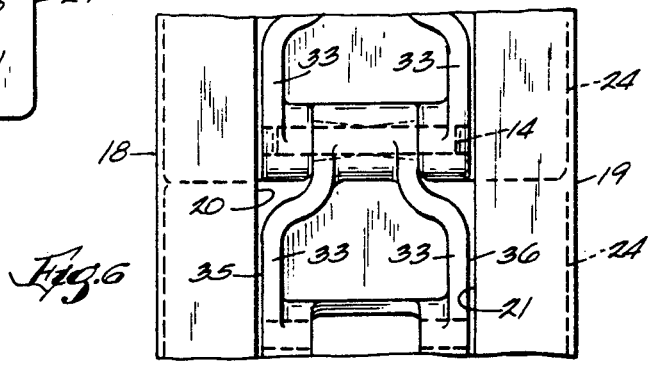
FIG. 6 is a bottom view of a portion of the conveyor shown in FIG. 1.

The links 12 each include a generally planar top plate 24 having a center hinge eye 25 at its trailing end and a pair of complementary hinge eyes 26 at its leading end. The trailing edges 27 of the links are preferably beveled and extend at a slight angle rearwardly, as seen in FIGS. 1 and 2, to permit relative pivotal movement of the links 12 in the horizontal direction. The hinge eye 25 extends outwardly and downwardly from the trailing edge of top plate 24 and has a bore 28 extending therethrough from end to end and having an axis parallel to the plane defining the upper carrying surface 29 of top plate 24. As seen particularly in FIGS. 2 and 4, the bore 28 is conical from its center to each end which also facilitates relative horizontal pivotal movement of the links 12. The eyes 26 extend downwardly from the leading edge of top plate 24 and are spaced apart on the opposite sides of the center line for receiving the eye 25 therebetween. In addition, each of the eyes 26 has a bore 31 aligned with the other for receiving the hinge pin 14, which also passes through the bore 28 of the eye 25 of the next adjacent identical link 12. In order to permit relative pivotal movement of the links 12 in the vertical direction, a gap 32 is formed in the top plate 24 between the eyes 26.

The links 12 according to the illustrated embodiment also include a pair of ribs 33 extending downwardly from the undersurface 34 of the top plate 24. At one end of the link, the outer surfaces 35 and 36 of the ribs 33, respectively, are spaced apart a distance equal to that between the outer ends of the eyes 26 and extend forwardly therefrom in general parallelism to inwardly curved sections which terminate in third sections spaced apart a distance defining gap 32 substantially equal to the width of the eye 25.

The links 12, the pins 14, and the wear strips 18 and 19 may be formed from a variety of materials depending upon the application. For example, steel or stainless steel is preferred for applications where abrasives, such as broken glass, are present, and in rugged industrial applications. Stainless steel is preferably employed where corrosive materials are present, while thermoplastic materials may be used to provide low friction chain or conveyor materials and to provide smooth product conveyance where little or no abrasion is present.

Figure 5:
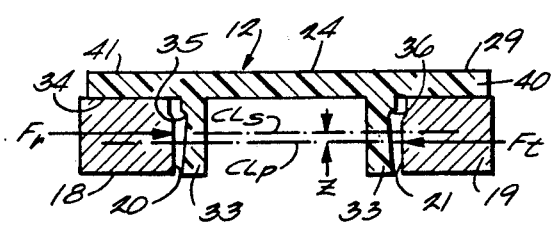
FIG. 5 illustrates the operation of the conveyor illustrated in FIG. 1.

As seen in FIG. 5, the outer surfaces 35 and 36 of the ribs 33 of each link 12 are disposed in proximity to the guide surfaces 20 and 21 of the wear strips 18 and 19. As the chain traverses a curved section of the wear strips as seen in FIG. 1, the tensile forces $F_t$ within the chain tend to force the link surfaces 35 at the inside of the curve against the corresponding guide surface 20 of the wear strip 18, which is also at the inside curve. These tensile forces $F_t$ cause the surface 35 of each link 12 to ride on the surface 20 at the inside of the curve so that surface 35 thus becomes the thrust surface. This results in a reaction force $F_r$ from the guide surface 20 on the thrust surface 35. As seen in FIG. 5, the tensile forces $F_t$ act along the centerline or axis $CL_p$ of the pin 14. The reaction forces, on the other hand, act across the entire contacting surface 35 so that the average reaction force $F_r$ acts along an average line of action, which in the illustrated embodiment is the centerline $CL_s$ of the reaction surface 35. The forces $F_t$ and $F_r$ thus provide a moment on link 12 acting in the clockwise direction, as viewed in FIG. 5, so that the side 40 of the link 12 on the outside of the curve is forced downwardly against the surface 23, thereby holding the chain within the track.

In this manner, the outside portions of chain links 12 are held within the curved portion of the track 16 without the necessity for tabs, inclined surfaces or magnetic retainers. This permits the chain to be lifted from the track for maintenance and cleaning. Furthermore, there is no necessity for fabricating any portion of the chain from ferromagnetic materials. As a result, plastic or stainless steel components may be used as may be desirable under the particular operating conditions.

In prior art conveyor chains, the pins connecting the chain links were normally located in close proximity to the upper surface of the chain to reduce kick-up of the carrying surface as the chain passed about the drive sprocket, thereby producing smoother transfer of product. As a result, the center line of the pin, through which the tensile forces acted, was located above the geometric center of the guide surface at the inside of the curve. This created a moment acting about the thrust surface centerline, tending to elevate the link on the outside of the curve from within the track, causing the link to pivot about an axis lying along the center of the thrust surface and tangent thereto. For these reasons, prior art chains employed tabs, beveled surfaces or magnets for holding the chain within the track. It has also been found that when the pin is located at the centerline of the thrust surface, no moment is created but that the chain lifts vertically upward without pivoting.

Figure 7:
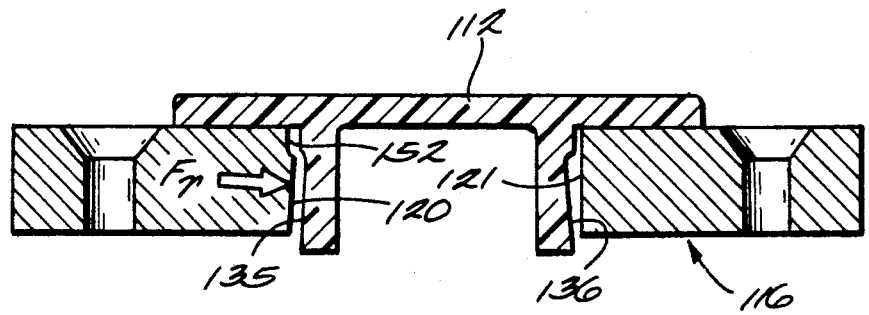
FIGS. 7, 8 and 9 illustrate the preferred embodiment of the invention.
Figure 8:
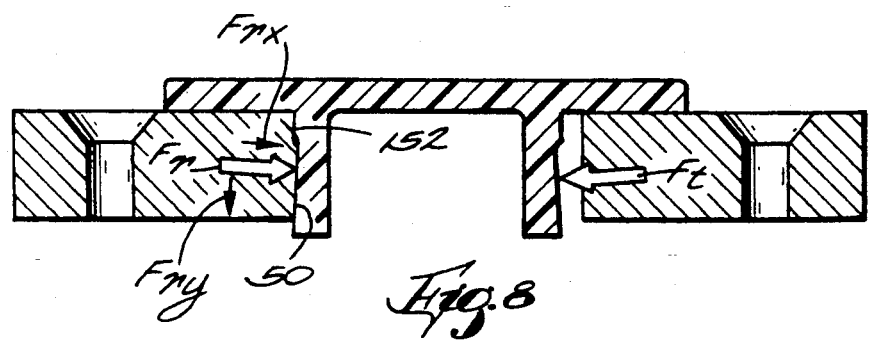
Figure 9:
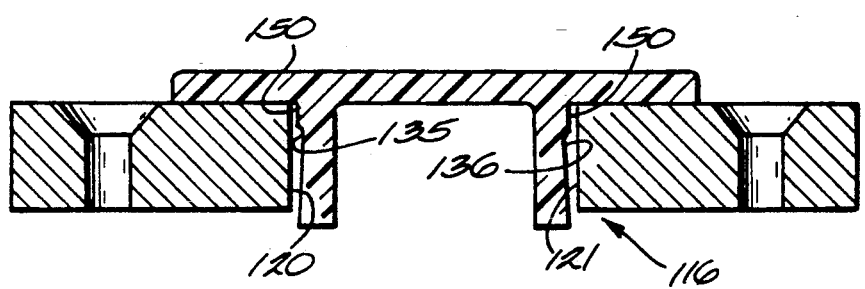

It will be appreciated that the couple produced on the chain links 12 by the tensile force $F_t$ and the reaction force $F_r$ and which tends to force the end 40 of the link 12 downwardly against the surface 23 at the outside of the curve will also tend to rotate the end 41 at the inside of the curve upwardly. The chain links 112 and the rails 118 and 119 according to the preferred embodiment of the invention illustrated in FIGS. 7, 8 and 9 are configured to compensate for this tendency. In particular, the outer surfaces 135 and 136 of the link ribs 133 are beveled outwardly at a small angle of about 2°-8° from their upper to their lower ends. In addition, the guide surface 120 at the inside of the curve is generally parallel to the link surface 135, that is, it is also beveled at the same or a slightly greater angle. For example, a link having a surface angle of about 3° would be preferably matched with a rail surface of about 3°-4°. A slightly greater rail surface angle provides a compensating factor for wear. The surface 121 at the outside of the curve may be perpendicular to the upper surface 123. In order to permit the chain to be elevated out of the track, the distance between the lower edges of the link surfaces 135 and 136 is less than the narrowest space between the guide surfaces 120 and 121.

As seen in FIG. 8, as the chain traverses a curved track section under load, the tensile forces $F_t$ will force the chain surface 135 against the guide surface 120. The reaction force $F_r$ is normal to the surface 135 of the link 112, which is at an angle relative to a plane perpendicular to the pin axis. As a result, the reaction force $F_r$ has a horizontal component $F_{rx}$ and a vertically downward component $F_{ry}$, both acting on the surface 135. The small component $F_{ry}$ acts to counter the reverse moment tending to lift the chain out of the track at the inside of the turn. Thus, the angled surfaces 120 and 135 at the inside of the curve act both to guide the chain in the conveyor and to lock the chain in the curved section of the track FIG. 9 shows the link 112 in a straight section of the track 16. Here, the guide surfaces 120 and 121 are shown to be perpendicular to the axis of the pin. In order to provide a guide for the chain link 112 in these straight track sections, a thin, perpendicular surface 150 is formed at the upper end of each of the inclined surfaces 135 and 136. In order to accommodate this vertical surface, a complementary surface 152 is formed at the upper edge of the guide surface 120 on the inside of the curved section. The surfaces 150 and 152 also provide an additional wear surface in this section of the track.

While only a few embodiments of the invention have been illustrated and described, it is not intended to be limited thereby, but only by the scope of the appended claims.

We claim:

1. A conveyor comprising track means having at least one arcuate section, said track means comprising a pair of spaced apart track portions each having a generally vertical surface which define a generally horizontally arcuate path therebetween, conveyor chain means constructed and arranged for traversing said arcuate path between the generally vertical surfaces, a first one of said surfaces defining the inside of said arcuate path and the other one of said surfaces defining the outside of said arcuate path, said conveyor chain means comprising a plurality of link means, each of said link means having a first pivotal connection means at one end thereof and a second pivotal connection means at the other end thereof and complementary to the first pivotal connection means, pin means pivotally coupling the first and second pivotal connection means of pairs of adjacent link means, said pin means being oriented transversely to the path defined by said surfaces, each of said link means being engageable with the first one of said surfaces as said chain means traverses said path to generate a reaction force acting on each link means and having an average line of action, the axis of said pin means being located below said average line of action to create a couple on said link means acting to retain said link means within said arcuate section, and being the sole means for retaining said chain means within the arcuate section of the track means.

2. The conveyor set forth in claim 1 wherein said line of action intersecting the first one of said surfaces at about its vertical center, the axis of said pin means lying below the vertical center of said surfaces.

3. The conveyor set forth in claim 1 wherein said track portions have a minimum spacing therebetween and each include a generally horizontal carrying surface, each link means including a generally planer top portion which is wider than the distance between said spaced apart track portion for being supported on said carrying surfaces, each link means including a second portion extending downwardly from the top portion and between said generally vertical surfaces, said first and second pivotal connection means forming a part of the second portion, the second potion being narrower at its widest part than the minimum spacing between said track portions so that the chain means may be lifted vertically from between said track portions.

4. The conveyor set forth in claim 3 wherein the link means has a contacting surface which engages the first one of said surfaces defining the inside of said path upon which said reaction force acts, the tensile forces in said chain means acting upon the axis of each of said pin means to create a couple which urges that portion of the link means on the outside of said track means into engagement with the track portion on the outside of said arcuate path, said reaction surface and said one surface being generally parallel to each other and forming a small angle relative to a plane perpendicular to the axis of said pin means and outwardly of said path.

5. The conveyor set forth in claim 4 wherein said angle is about 2°–8°.

6. The conveyor set forth in claim 4 wherein each of said track means has a generally horizontal carrying surface, link means each including a generally planar top portion for being supported on said carrying surface, said first pivotal connecting means comprising first eye means extending downwardly from one end of said link means and at substantially the center of said one end and said second pivotal connecting means comprising a pair of eye means extending downwardly from the opposite end of said link means and spaced apart from the center thereof for engaging the first eye means on an adjacent link means, said pin means extending through the second eye means on one link means and the first eye means on the adjacent link means for pivotally connecting the same.

7. The conveyor set forth in claim 6 wherein said first eye means includes at least one eye and the second eye means comprising at least two spaced apart eye means for receiving the one eye means on an adjacent link, said pin means extending through aligned openings in said eye means for hingedly connecting adjacent link means.

8. The conveyor set forth in claim 3 wherein the link means has a generally vertical reaction surface which engages the first one of said surfaces defining the inside of said path upon which said reaction force acts, the tensile force in said chain means acting along the axis of each of said pin means to create a couple which urges that portion of the link means into engagement with the track portion on the outside of said arcuate path.

9. The conveyor set forth in claim 8 and including first and second rib means extending downwardly from said top portion in a spaced apart relation and each rib means having a contacting surface for engaging one of said track surfaces, the greatest distance between said contacting surfaces being less than the smallest distance between said track portions.

10. The conveyor set forth in claim 3 wherein each of the link means has a reaction surface which engages the guide surface defining the inside of said path upon which said reaction force acts, the tensile forces in said chain means acting upon the axis of each of said pin means to create a couple which urges that portion of the link means on the outside of said track means into engagement with the track portion on the outside of said arcuate path, said reaction surface and said guide surface being generally parallel to each other and forming a small angle relative to a plane perpendicular to the axis of said pin and outwardly relative to said path.

11. The conveyor set forth in claim 10 wherein said angle is about 2°–8°.

12. The conveyor set forth in claim 10 wherein each of said top portions are generally planar, said eye means connecting means comprising a first eye means extending downwardly from the center of one end of each link means and a pair of eye means extending downwardly from the opposite end of each link means and spaced apart from the center thereof for engaging the first eye means on an adjacent link means, said pin means extending through the second eye means on one link means and the first eye means on the adjacent link means for pivotally connecting the same.

13. The conveyor set forth in claim 3 wherein the link means has a pair of reaction surfaces which extend downwardly between said track means, one of said reaction surfaces engaging said guide surface and is acted upon by said reaction force, the tensile force in said chain means acting along the axis of each of said pin means to create a couple which urges that portion of the link means into engagement with the track portion on the outside of said arcuate path, the distance between said reaction surfaces at the point of greatest separation being less than the distance between said track means at the point of smallest separation.

14. A conveyor system including track means and a conveyor chain, the track means comprising a pair of spaced apart track portions defining a path through which the conveyor chain traverses and including at least one horizontally curved section, one track portion defining the inside of said curved section and the other track portion defining the outside thereof, said one track portion including a generally vertical guide surface engaged by said conveyor chain as it traverses the curved section, said conveyor chain comprising a plurality of links, each of said links inclining a top portion constructed and arranged to move over said track means for being supported thereby, eye means projecting downwardly from said top link portions and into juxtaposed relation with the eye means of the adjacent links, pivot pin means pivotally connecting said juxtaposed eye means of adjacent links and having their axes substantially perpendicular to the direction of said path, the engagement of said links with the guide surface generating a reaction force on said links which is distributed over said guide surface and having an average line of action, the axis of said pin means lying below said line of action, said reaction force being the sole means for retaining said conveyor chain within the horizontally curved track section.

15. The conveyor set forth in claim 14 wherein said reaction surfaces are generally vertical, said average line of action intersecting the first one of said surfaces at about its vertical center, the axis of said pivot pin means lying below the vertical center of said surfaces.

16. The conveyor set forth in claim 14 wherein said track portions have a minimum spacing therebetween and each includes a generally horizontal carrying surface, each link including a generally planer top portion which is wider than the distance between said spaced apart track portions for being supported on said carrying surfaces, each link including a second portion extending downwardly from the top portion and between said generally vertical surfaces, said first and second pivotal connection means forming a part of the second portion, the second portion being narrower at its widest part than the minimum spacing between said track portions so that the chain may be lifted vertically from between said track portions.

17. A conveyor comprising a conveyor chain, and a track having at least one curved section, said track comprising a pair of spaced, generally parallel rails having carrying surfaces over which the chain traverses, said chain having links each presenting a substantially planar carrying surface and a depending portion having connection means located below said carrying surface and including first eye means adjacent one end of each said link and second eye means adjacent the opposite end of each said link, hinge pins for hingedly connecting the eye means of adjacent links, a guide surface depending from each rail for guiding the chain laterally relative to the rails, said guide surfaces being horizontally spaced apart, said depending portion engaging the guide surface at the inside of said curved section to generate a reaction force on said links having an average line of action extending generally parallel to the carrying surfaces, the axis of said hinge pin lying below the line of action of said reaction force.

18. The conveyor set forth in claim 17 wherein the depending portion being narrower at its widest portion being narrower at its widest point than the horizontal spacing between said guide surfaces at their point of narrowest spacing so that the chain may be lifted from said track.

19. The conveyor set forth in claim 18 and including first and second rib means extending downwardly from said top portion in a spaced apart relation and each rib means having a contacting surface for engaging said guide surfaces, the distance between said contacting surfaces at the point of greatest separation being less than the distance between said rails at the point of smallest separation.

20. The conveyor set forth in claim 18 wherein the link means has a reaction surface which engages the guide surfaces defining the inside of said curved section upon which said reaction force acts, the tensile forces in said chain means acting upon the axis of each of said pins to create a couple which urges that portion of the link means on the outside of said track into engagement with the track portion on the outside of said curved section, said reaction surface and said one surface being generally parallel to each other and forming a small angle relative to a plane perpendicular to the axis of said pin and being inclined outwardly.

21. The conveyor set forth in claim 20 wherein said angle is about 2°–8°.

22. The conveyor set forth in claim 17 wherein said line of action intersecting the first one of said surfaces at about its vertical center, the axis of said pins lying below the vertical center of said surfaces.

23. The conveyor set forth in claim 17 wherein said first eye means extending downwardly from one end of said link means and at substantially the center of said one end and said second eye means comprising a pair of eye means extending downwardly from the opposite end of said link means and spaced apart from the center thereof for engaging the first eye means on an adjacent link means, said pin means extending through the second eye means on one link means and the first eye means on the adjacent link means for pivotally connecting the same.

24. A conveyor chain for use in a conveyor including a pair of spaced, generally parallel rails having at least one curved section, each said rial including a carrying surface over which the chain traverses and a guide surface depending generally vertically from the carrying surfaces and having a predetermined minimum spacing from the other guide surface for guiding a chain laterally relative to the rails, said chain having links presenting a substantially planar carrying surface and having a depending portion defining connecting means located below said carrying surface and including first eye means on one end of said link and second eye means on the opposite end of said link, a hinge pin for hingedly connecting the eye means of adjacent links, said links being constructed and arranged for engaging the guide surface at the inside of a curve to generate a reaction force on said links having an average line of action extending generally parallel to the carrying surfaces, the axis of said hinge pin lying below the line of action of said reaction force, the width of said depending portion at its widest part being less than the predetermined minimum spacing between said guide surfaces so that said conveyor chain can be lifted vertically from between said rails.

25. The conveyor chain set forth in claim 24 wherein said first eye means includes at least one eye and the second eye means comprising at least two spaced apart eye means for receiving the one eye means on an adjacent link, said pin means extending through aligned openings in said eye means for hingedly connecting adjacent links.

26. The conveyor chain set forth in claim 25 wherein said planar carrying surface is defined by a top portion and including first and second rib means extending downwardly from said top portion in a spaced apart relation and each rib means having a contacting surface for engaging a guide surface, the distance between said guide surfaces at the point of greatest separation being less than the distance between said rails at the point of smallest separation.

27. The conveyor set forth in claim 26 wherein said contacting surface and said guide surface at the inside of said curve being parallel to each other and forming a small angle relative to a plane perpendicular to the axis of said pin and being inclined outwardly, the tensile forces in said chain means acting upon the axis of each of said pin means to create a couple which urges that portion of the link means on the outside of said track into engagement with the track portion on the outside of said arcuate path.

28. The conveyor set forth in claim 27 wherein said angle is about 2°–8°.

29. The conveyor chain set forth in claim 28 wherein said first eye means extends downwardly from one end of said link means and at substantially the center of said one end and said second eye means comprising a pair of eye means extending downwardly from the opposite end of said link means and spaced apart on the opposite sides of the center thereof for engaging the first eye means on an adjacent link means, said pin means extending through the second eye means on one link means and the first eye means on the adjacent link means for pivotally connecting the same.

30. The conveyor chain set forth in claim 24 wherein the link means has a contact surface which is constructed and arranged for engaging a guide surface defining the inside of an arcuate path and upon which a reaction force acts, said contact surface and guide surface forming a small angle with a plane perpendicular to the axis of said hinge pin, the tensile force in said chain which occurs when said chain traverses an arcuate conveyor track acting along the axis of each of said pin means so that a couple is created which urges the link means into engagement with the track portion on the outside of said arcuate path.

31. A link constructed and arranged to be joined with like links to form a conveyor chain for use in a conveyor including a pair of spaced apart track means defining a curved path through which the conveyor chain traverses and each track means having a guide surface depending generally vertically and wherein one of the track means defines the inside of the curved section and the other track means defines the outside thereof, said guide surfaces having a predetermined minimum spacing therebetween, said link including a top portion constructed and arranged to move over a track means for being supported thereby and a portion depending from said top portion, said depending portion first and second eye means projecting downwardly from said top link portion at the opposite ends of the link being positioned, respectively, adjacent a complementary eye means of an adjacent links, first and second pivot openings in said first and second eye means, respectively, for receiving a pivot pin therethrough for pivotally connecting said first and second eye means with those of adjacent links, said link having a reaction surface engageable with a guide surface for generating a reaction force on said reaction surface which is distributed over said surface and having an average line of action, the axis of said pin openings lying below said line of action, the width of the depending portion at its widest part being less than the predetermined minimum spacing between the guide surfaces so that the conveyor chain can be lifted vertically from between the rails.

32. The conveyor set forth in claim 31 wherein said top portion is generally planar, said first eye means extending downwardly from the center of one end of said link and said second eye means comprising a pair of eye means extending downwardly from the opposite end of said link and spaced apart from the center thereof for embracing the first eye means on an adjacent link means.

33. The conveyor set forth in claim 31 wherein said vertical reaction surface and said guide surface each form a small angle with a plane perpendicular to the axis of said hinge pin, the tensile force in said link acting along the axis of said pin openings to create a couple which urges that portion of the link means adapted to be positioned at the outer portion of a curved path into engagement with a track portion on the outside of an arcuate path through which said link traverses as part of a conveyor chain.

34. A conveyor chain means for traversing a track means having at least one arcuate section and comprising a pair of spaced apart track portions, each having a guide surface, which define an arcuate path therebetween, a first one of the guide surfaces defining the inside of the arcuate path and the other one of the guide surfaces defining the outside of the arcuate path, there being a minimum predetermined spacing between the guide surfaces, said conveyor chain means comprising a plurality of link means, each of said link means having a portion for being disposed between said surfaces and defining a first pivotal connection means at one end thereof and a second pivotal connection means at the other end thereof and complementary to the first pivotal connection means, pin means pivotally coupling the first and second pivotal connection means of pairs of adjacent link means, said pin means being oriented transversely to the path traversed by said chain means, each of said link means being engageable with a first one of the path defining surfaces as said chain means traverses said path to generate a reaction force acting on each said link means and having an average line of action, the axis of said pin means being located below said average line of action to create a couple on said link means acting to retain said link means within the arcuate section of the track portions, the width of the link portion at its widest part being less than the predetermined minimum spacing between the guide surfaces so that the conveyor chain means can be lifted vertically from between the guide surfaces.

35. The conveyor set forth in claim 34 wherein said link means each includes a generally planar top portion for being supported on a carrying surface, said first pivotal connecting means comprising first eye means extending downwardly from one end of said link means and at substantially the center of said one end and said second pivotal connecting means comprising a pair of eye means extending downwardly from the opposite end of said link means and spaced apart from the center thereof for engaging the first eye means on an adjacent link means, said pin means extending through the second eye means on one link means and the first eye means on the adjacent link means for pivotally connecting the same.

36. The conveyor set forth in claim 35 wherein said first eye means includes at least one eye and the second eye means comprising at least two spaced apart eye means for receiving the one eye means on an adjacent link means, said pin means extending through aligned openings in said eye means for hingedly connecting adjacent link means.

37. The conveyor set forth in claim 34 wherein the link means has a reaction surface which engages the first one of said surfaces defining the inside of said path upon which said reaction force acts, the tensile forces in said chain means acting upon the axis of each of said pin means to create a couple which urges that portion of the link means on the outside of said track into engagement with the track portion on the outside of said arcuate path, said reaction surface and said one surface each forming a small angle relative to a plane perpendicular to the axis of said pin and being inclined outwardly relative to said path.

38. The conveyor set forth in claim 37 wherein said angle is about 2°–8°.

* * * * *